United States Patent [19]

Shima et al.

[11] Patent Number: 4,949,270
[45] Date of Patent: Aug. 14, 1990

[54] METHOD OF CREATING NC PROGRAM FOR POCKET MACHINING

[75] Inventors: Atsushi Shima; Tetsuya Shimizu; Naoki Fujita, all of Tokyo, Japan

[73] Assignee: Fanuc Ltd, Minamitsuru, Japan

[21] Appl. No.: 219,159

[22] PCT Filed: Oct. 15, 1987

[86] PCT No.: PCT/JP87/00775
§ 371 Date: Jun. 15, 1988
§ 102(e) Date: Jun. 15, 1988

[87] PCT Pub. No.: WO88/03073
PCT Pub. Date: May 5, 1988

[30] Foreign Application Priority Data

Oct. 21, 1986 [JP] Japan ................................. 61-250360

[51] Int. Cl.⁵ .......................................... G05B 19/405
[52] U.S. Cl. ................................ 364/474.26; 364/191; 364/474.27; 364/474.29; 364/474.33
[58] Field of Search ........... 364/474.2, 474.22–474.29, 364/191–193, 474.32, 474.33; 318/568.1; 340/734

[56] References Cited

U.S. PATENT DOCUMENTS

| | | | |
|---|---|---|---|
| 4,575,791 | 3/1986 | Schwefel | 364/168 |
| 4,627,003 | 12/1986 | Kishi et al. | 364/520 |
| 4,802,083 | 1/1989 | Isobe et al. | 364/191 |

Primary Examiner—Joseph Ruggiero
Attorney, Agent, or Firm—Staas & Halsey

[57] ABSTRACT

The method of the invention includes displaying a profile outline (POL) and a graphic cursor (CSR) on a display screen, adopting points, which are obtained on the display screen by successively positioning the graphic cursor and inputting its coordinates at starting points and end points of linear cutting or circular arc cutting, displaying a tool shape (TL) having a designated diameter at the inputted points, displaying a tool path (TLP) by successively connecting the inputted points by straight lines or circular arcs, and creating an NC program for moving a tool along the tool path to perform pocket machining.

4 Claims, 16 Drawing Sheets

METHOD OF CREATING NC PROGRAM FOR POCKET MACHINING

BACKGROUND OF THE INVENTION

1. Field of the Invention

This invention relates to a method of creating an NC program for pocket machining and, more particularly, to an NC program creation method through which an NC program for pocket machining is created in conversational fashion.

2. Description of the Related Art

Machining (pocket machining) for hollowing out the interior of a profile outline down to a predetermined depth includes such methods as ordinary linear unidirectional cutting, linear zigzag cutting and spiral cutting. In linear unidirectional cutting, the interior of the profile outline is machined by moving a tool in one direction at all times [see FIG. 13(a)]. In linear zigzag cutting, the interior of the profile outline is machined continuously not only in an outward direction but in a return direction as well [see FIG. 13(b)]. In spiral cutting, the interior of the profile outline is machined by moving a tool along offset paths each inwardly offset a predetermined amount from the profile outline [see FIG. 13(c)].

In the prior art, an NC program for such pocket machining is created by automatically deciding the tool path, which is performed upon inputting the profile outline, the pocket machining method (one of the cutting methods of FIGS. 1 through 3), the cutting direction, cut-in direction, finishing allowance, remaining thickness, spindle rotational speed, cutting velocity, tool diameter and the like.

In this conventional method, however, considerable time is required for NC program creation when the profile is a complicated one, and the tool paths includes needless paths (paths which do not contribute to cutting). As a result, cutting efficiency is poor.

FIG. 14 illustrates a tool path 2 for a case in which the interior of a profile 1 is machined by linear zigzag cutting. The portions indicated by the dashed lines do not participate in cutting and represent wasted motion. FIG. 15 illustrates a tool path 3 for a case in which the interior of the profile 1 is machined by spiral cutting. The tool path is complicated, a considerable period of time is required to obtain the tool path, and the cutting time is prolonged.

FIG. 16 illustrates a tool path 4 which is ideal for cutting the interior of the profile 1. The tool path does not contain unneeded path segments and cutting efficiency is high. A method of creating a tool path such as shown in FIG. 16 is not available in the prior art and, as a result, the machining carried out exhibits a poor cutting efficiency.

SUMMARY OF THE INVENTION

An object of the present invention is to provide an NC program creation method through which an NC program for pocket machining having a high cutting efficiency can be created in a simple manner.

The method of the invention includes displaying a profile outline and a graphic cursor on a display screen, adopting points, which are obtained on the display screen by successively positioning the graphic cursor and inputting its coordinates at starting points and end points of linear cutting or circular arc cutting, displaying a tool shape having a designated diameter at the inputted points, displaying a tool path by successively connecting the inputted points by straight lines or circular arcs, and creating an NC program for moving a tool along the tool path to perform pocket machining.

DESCRIPTION OF THE PREFERRED EMBODIMENT

Figure 1:
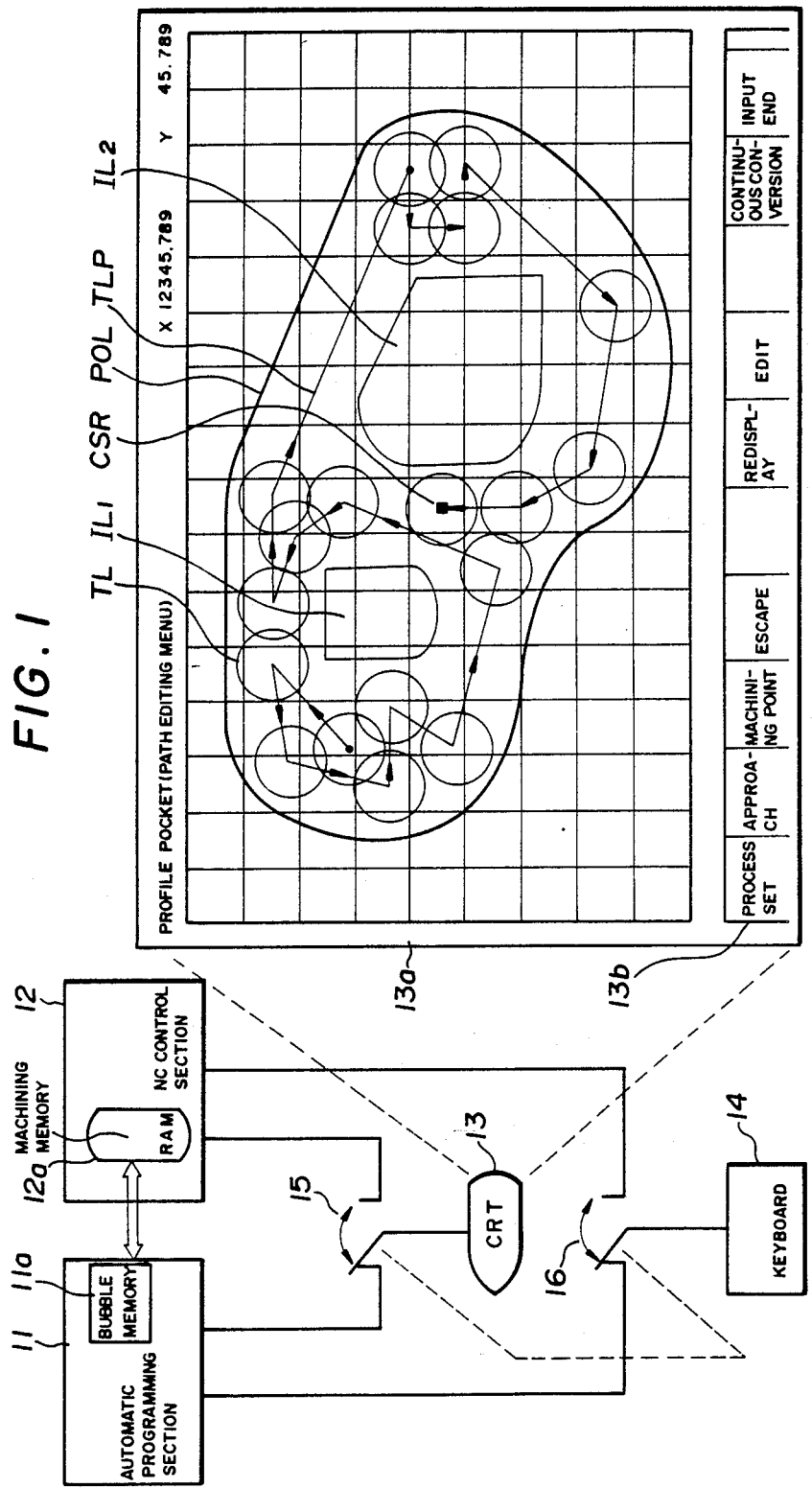
FIG. 1 is a block diagram of an NC apparatus for practicing the present invention.
Figure 2:
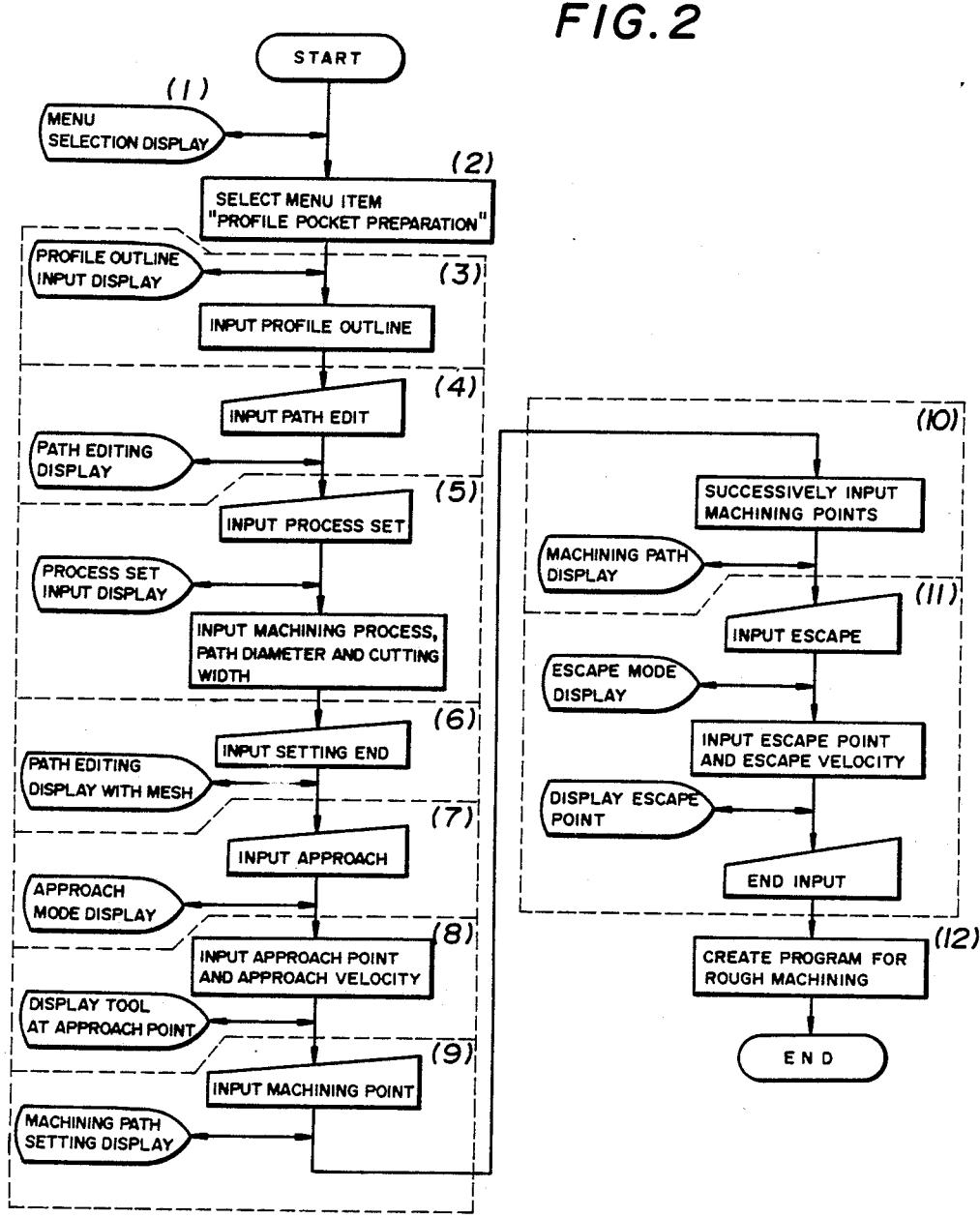
FIG. 2 is a flowchart of processing according to the invention.

FIG. 1 is a block diagram of an NC apparatus for practicing the present invention, and FIG. 2 is a flowchart of processing for NC program creation according to the invention.

In FIG. 1, numeral 11 denotes an automatic programming section, 12 an NC control section, 13 a graphic display unit (CRT), 14 a keyboard, and 15, 16 changeover units.

The automatic programming section 11 and NC control section 12 are each constituted by a microcomputer and incorporate a processor, a control program memory (ROM) and a RAM.

The graphic display unit 13 and keyboard 14 are of integrated construction and constitute a unit ordinarily referred to as a CRT & MDI unit. The display screen is split into a conversational display section 13a and a soft key section 13b. In FIG. 1, a state in which a tool path has been inputted is displayed in the conversational display section 13a. In the conversational display, POL denotes a profile outline, CSR a graphic cursor, TLP a tool path, and $IL_1$–$IL_2$ islands each representing the interior of a region.

The general features of the invention will now be described. The profile outline POL, which has already been inputted, is painted (displayed) on the display screen and the graphic cursor CSR is displayed at an initial position (the center of the display screen).

Next, the graphic cursor is successively positioned and its coordinate are inputted at selected points on the display screen by using a cursor shift key.

As a result, the automatic programming section 11 successively adopts the inputted points as cutting starting and end points for linear cutting, displays the tool shape TL having a designated radius at the inputted points, and displays the tool path TLP by successively connecting the inputted points with straight lines.

Finally, an NC program is created for performing pocket machining by moving a tool along the tool path TLP.

Processing according to the invention will now be described in detail in accordance with the flowchart of FIG. 2.

(1) A predetermined key on the keyboard 14 is operated to dedicate the graphic display unit 13 and keyboard 14 to the automatic programming section 11 and to display a menu selection page on the display screen. It should be noted that menu names for processing described below, such as "SIDE FACE MACHINING PROFILE PREPARATION", "PROFILE POCKET PREPARATION", are displayed on the menu selection page.

(2) Under these conditions, the menu item "PROFILE POCKET PREPARATION" is selected.

(3) Since a profile outline input display page is presented on the display screen as a result, the profile outline is inputted. It should be noted that the operator subsequently performs an NC data creation operation for pocket machining the interior of the profile outline.

Figure 3:
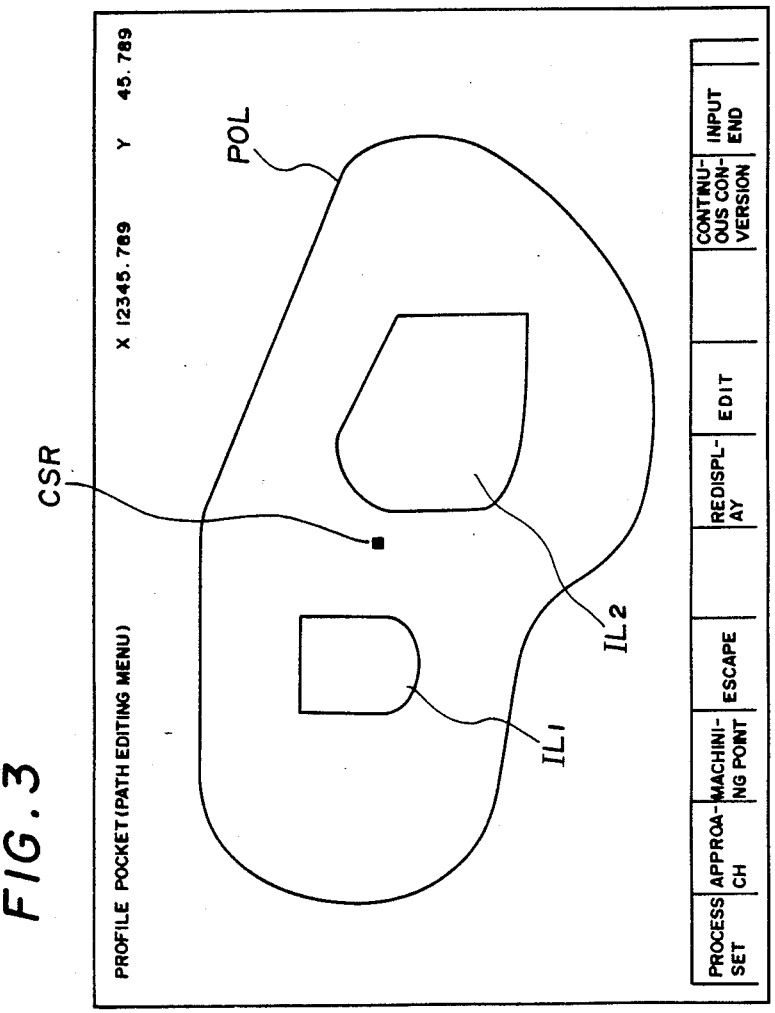
FIGS. 3 through 12 are examples of conversational displays according to the invention.

(4) After the profile outline is inputted, "PATH EDIT" displayed in the soft key section of the profile outline input display page is inputted. As a result, a path editing display page is displayed on the display unit, as shown in FIG. 3.

It should be noted that the profile outline POL (inclusive of the shapes of islands $IL_1$, $IL_2$) inputted at step (2) is displayed on the path editing display page, and that the graphic cursor CSR is displayed at the center of the display screen, which is the initial position.

(5) "PROCESS SET" is inputted using a soft key while the path editing page is being displayed. In response, a process setting input display page (not shown) is displayed. Accordingly, the operator refers to the displayed page and inputs the machining process (whether the process is pocket machining or end face finishing), the radius R of the tool used, and cutting width $\alpha$ (%) indicating what percentage of the tool diameter is used for cutting.

Figure 4:
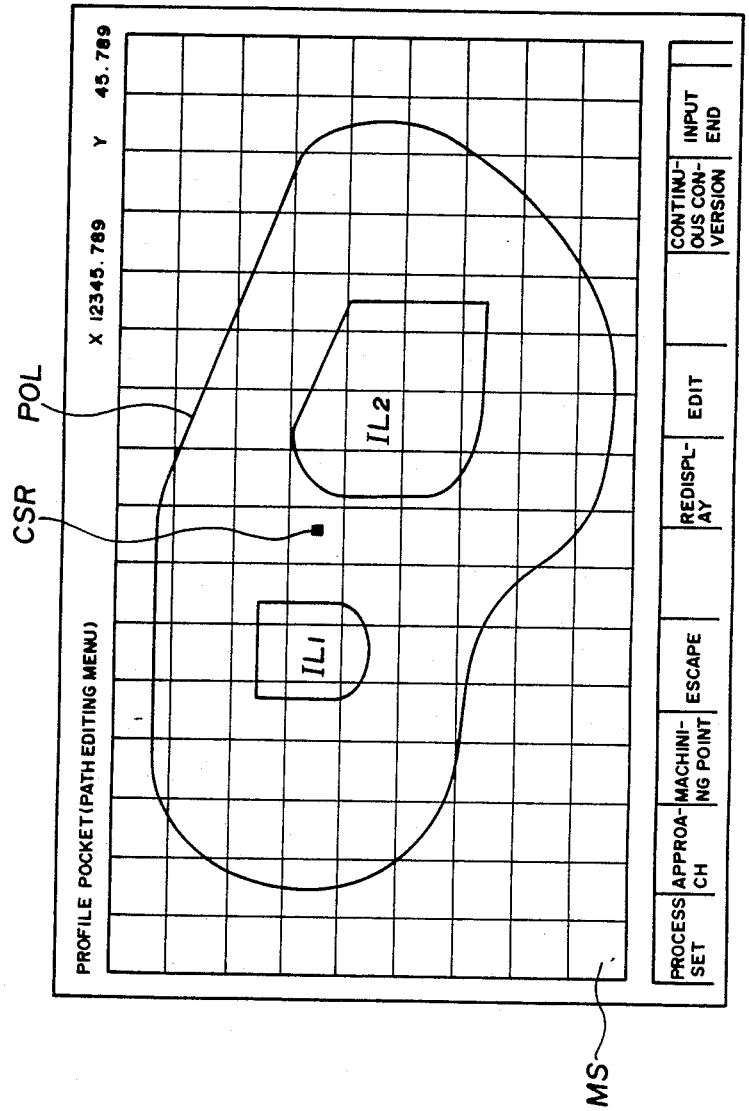

(6) After all data are entered, "SETTING END" is inputted using a soft key on the processing setting input display page, whereupon a path editing display page equipped with a grid or meshes of a predetermined color is displayed, as shown in FIG. 4.

It should be noted that the length l of one side of each mesh MS or square MS in the grid is represented by the following:

$$l = R \cdot 2 \cdot \alpha / 100$$

Figure 5:
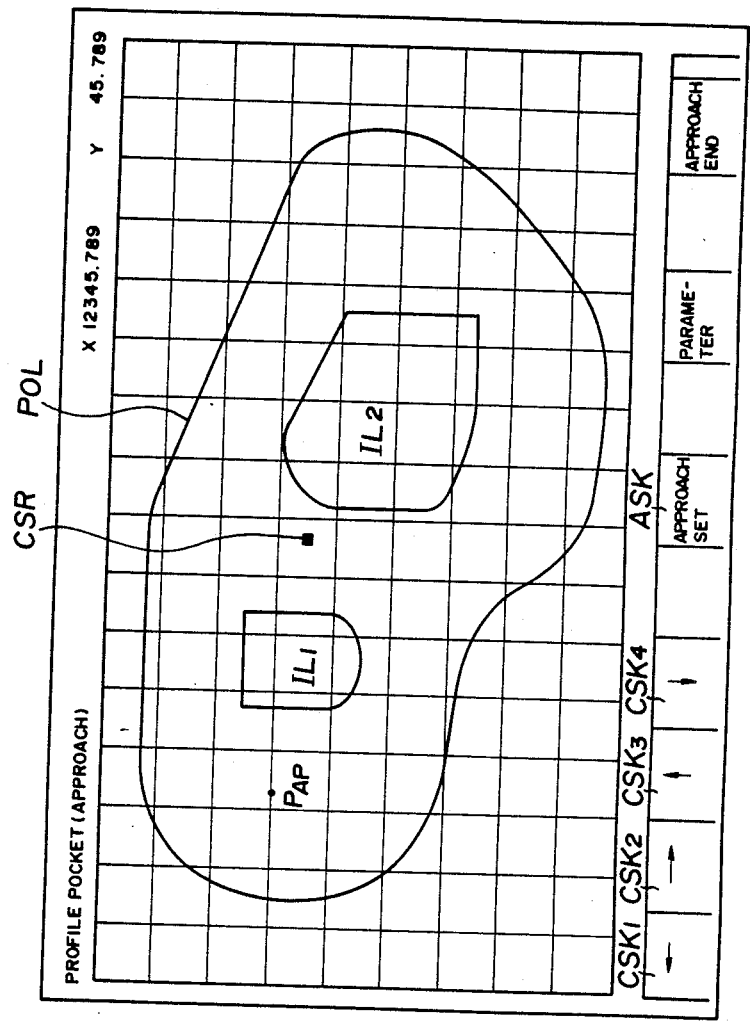

(7) In the state where the path editing display page equipped with the meshes is being displayed, "APPROACH" is inputted using a soft key, whereupon an approach mode display page for specifying an approach point and the like is displayed, as illustrated in FIG. 5.

Figure 6:
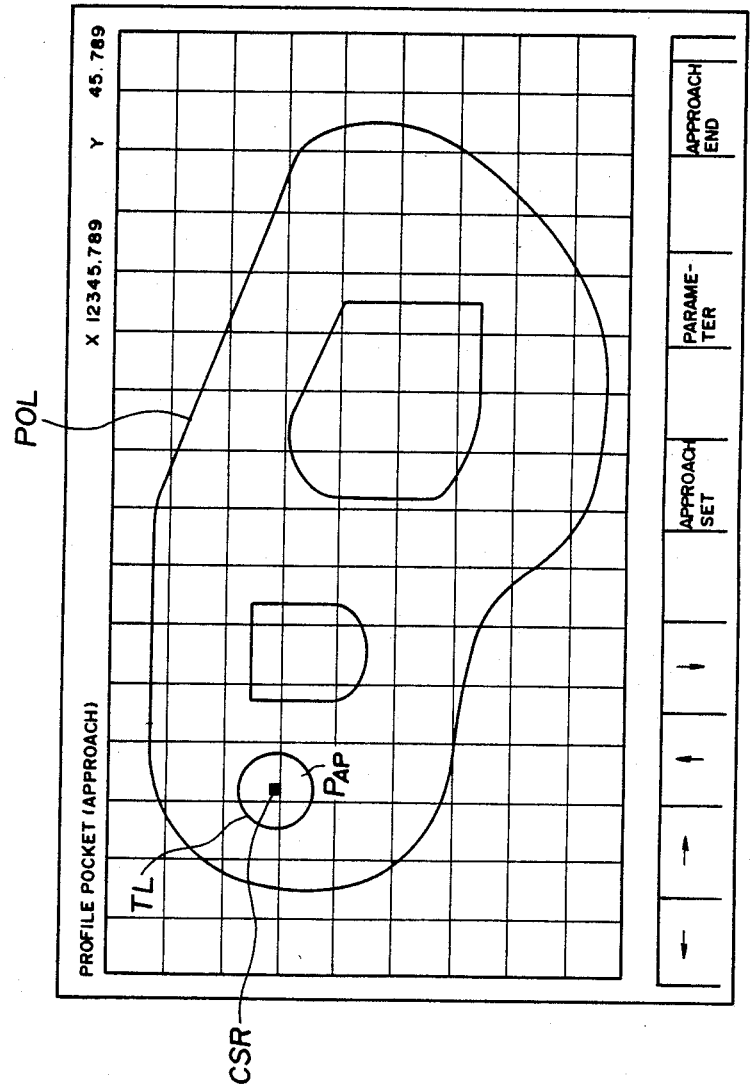

(8) Under these conditions, the graphic cursor is positioned at an approach point $P_{AP}$ by pressing soft keys CSK1–CSK4, which are arrow keys for shifting the cursor, and then a shift key ASK for "APPROACH SET" is pressed, whereupon the tool shape TL having the tool diameter inputted at step (5) is displayed at the set approach point $P_{AP}$, as shown in FIG. 6.

Figure 7:
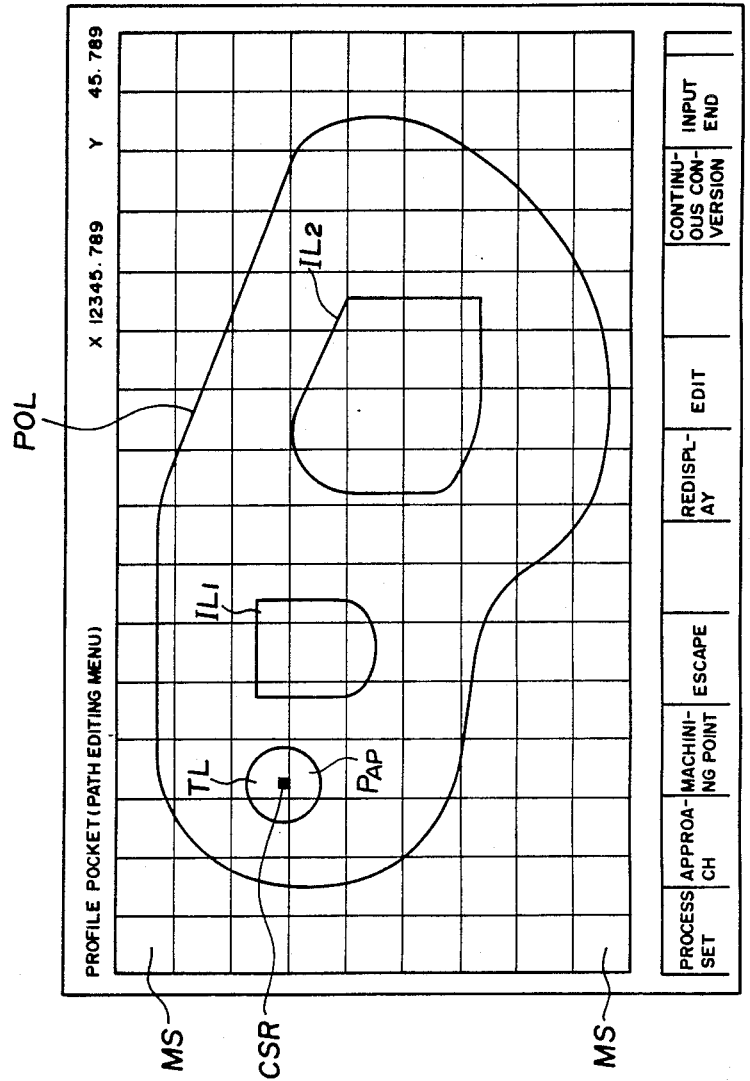

Thereafter, "PARAMETER" is inputted using a software key, thereby establishing an approach velocity input page (not shown). After the approach parameter is inputted, a soft key is used to input "SETTING END". A path editing page, in which the tool shape is displayed at the approach point $P_{AP}$, is displayed along with the meshes, as depicted in FIG. 7.

Figure 8:
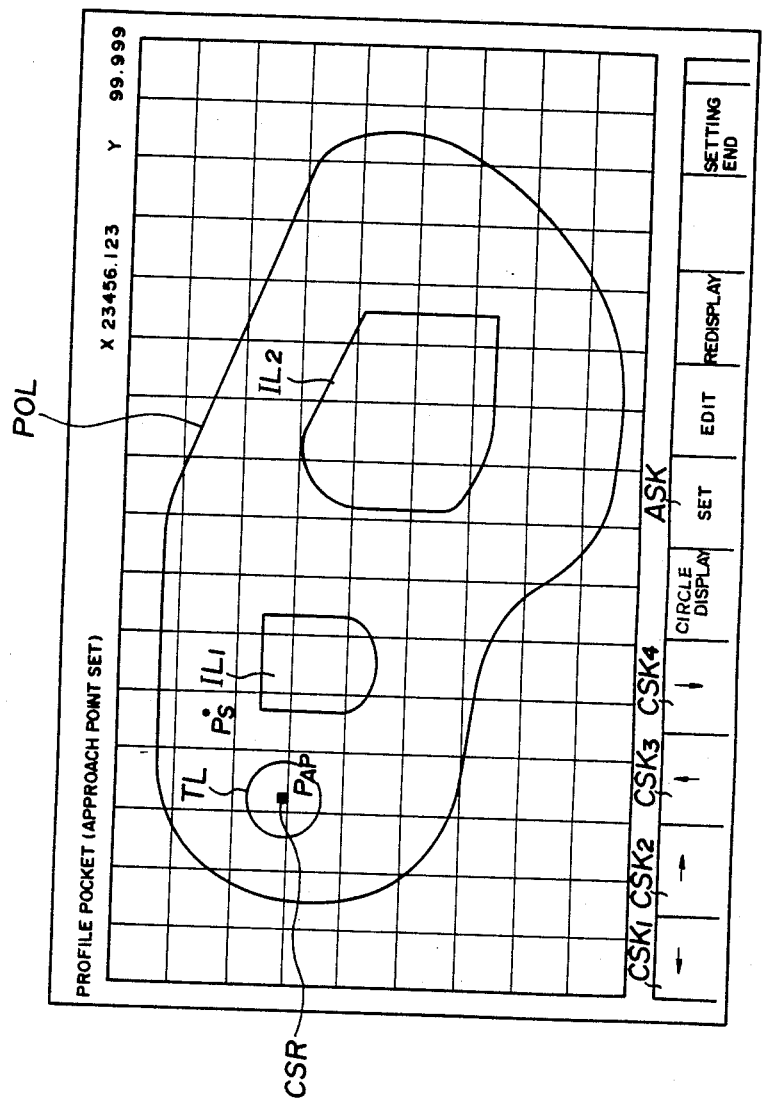

(9) If "MACHINING POINT" is inputted using a soft key in a state where the path editing page is being displayed, a machining path setting page shown in FIG. 8 is displayed on the display screen.

Figure 9:
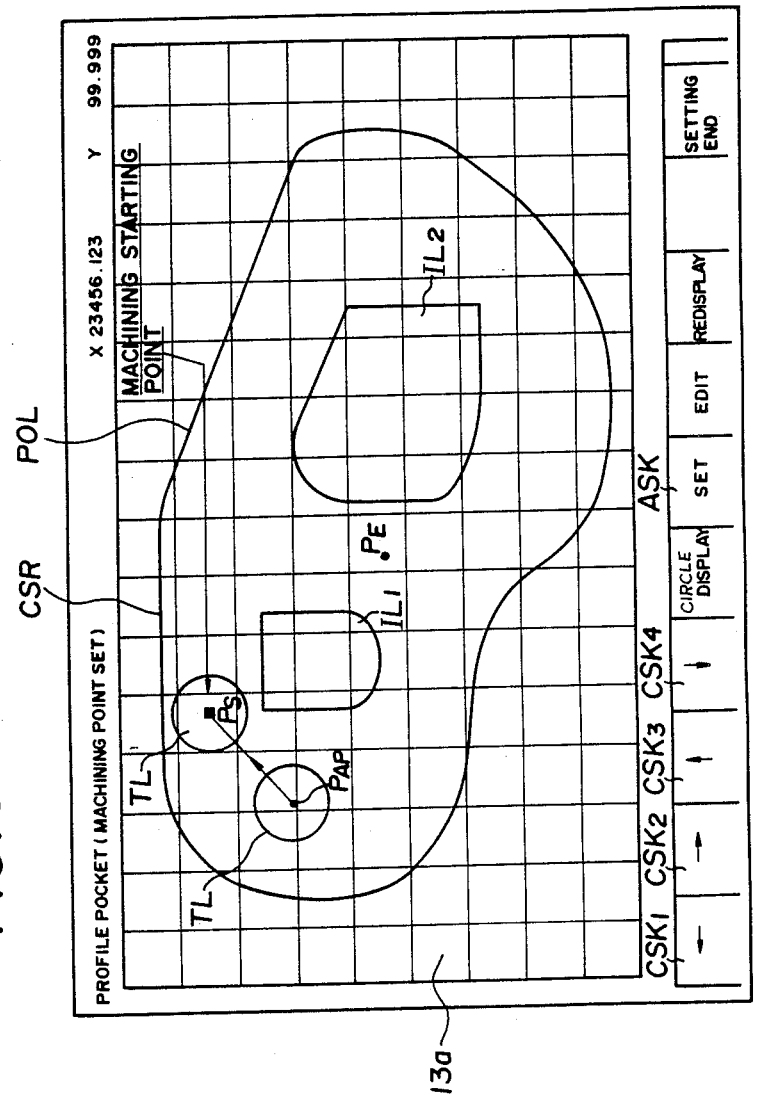

(10) In this state, the graphic cursor CSR is positioned at a machining starting point $P_s$ by pressing the soft keys CSK1–CSK4, which are arrow keys for shifting the cursor, and then the shift key ASK for "SET" is pressed, whereupon the tool shape TL is displayed at the set machining starting point $P_s$, as shown in FIG. 9, and the approach point $P_{AP}$ and machining starting point $P_s$ are connected by a straight line.

Thereafter, the graphic cursor is successively positioned at the starting and end points of cutting along each straight line on the premise that pocket machining is to be performed by continuous cutting along straight lines, and these points are inputted by pressing the soft key "SET". When this is done, the tool shape TL is displayed at these points on the conversational display page 13a of FIG. 9, as well as the tool path TLP obtained by successively connecting the inputted points by straight lines.

Figure 10:
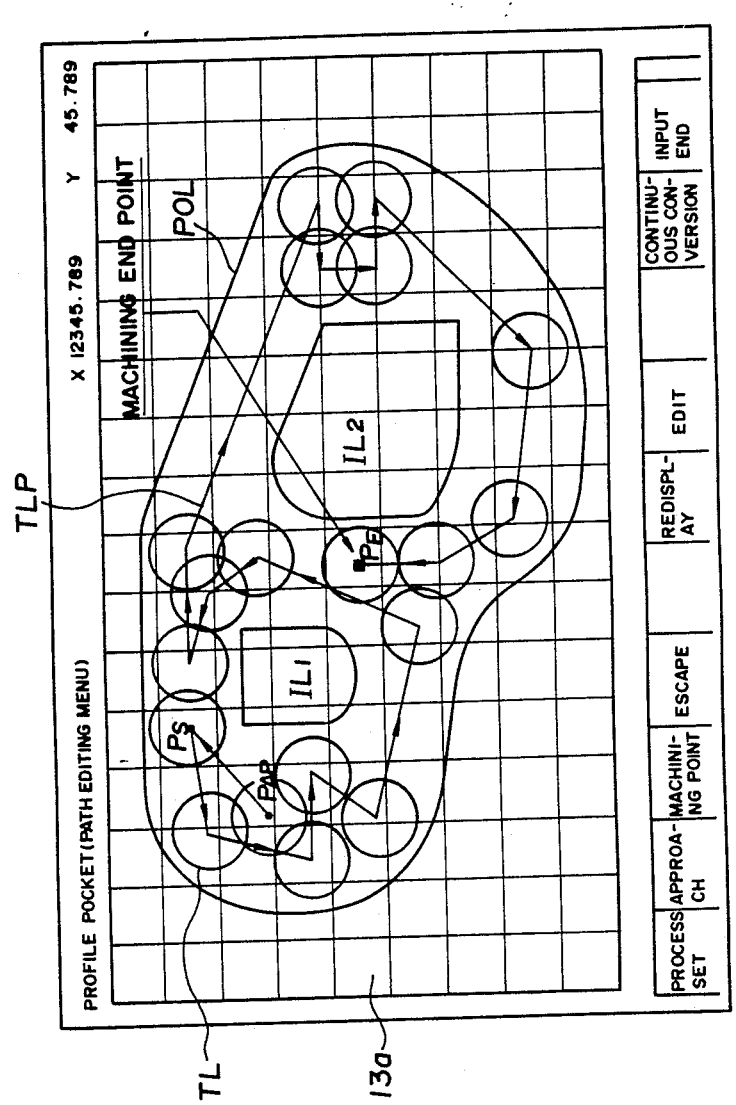

When the inputting of the cutting path TLP ends by performing a similar setting operation up to the cutting end point $P_E$, "SETTING END" is inputted using the soft key. In response, the path editing display page of FIG. 10 is displayed on the display screen. The tool path TLP is displayed on the conversational display section 13a.

Figure 11:
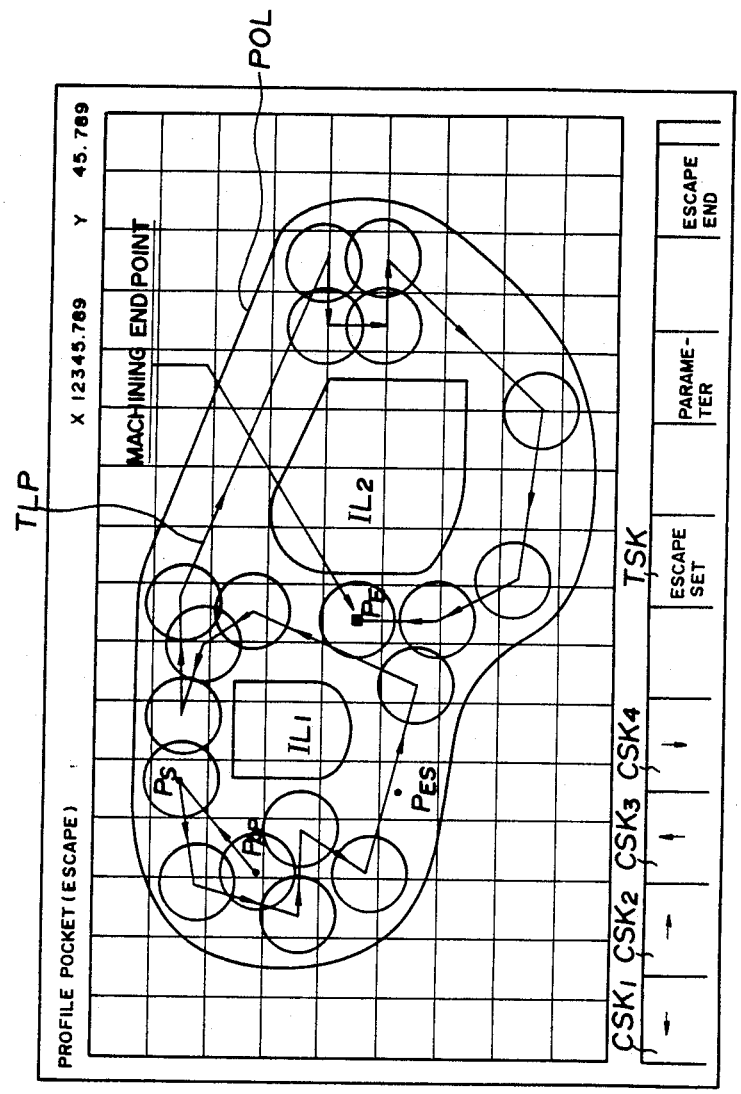

(11) When "ESCAPE" is inputted by using a soft key while this display is in effect, an escape mode display page for inputting escape points and the like is displayed, as shown in FIG. 11.

Next, the graphic cursor is positioned at an escape point $P_{ES}$ by pressing the arrow soft keys CSK1–CSK4, after which a soft key ESK marked "ESCAPE SET" is pressed. When this is done, the tool shape TL is displayed at the set escape point $P_{ES}$, as shown on the conversational display page 13a of FIG. 12.

Thereafter, "PARAMETER" is inputted using the soft key to establish an escape parameter input display. Then, after the escape velocity is inputted, "SETTING END" is inputted using the soft key.

Figure 12:
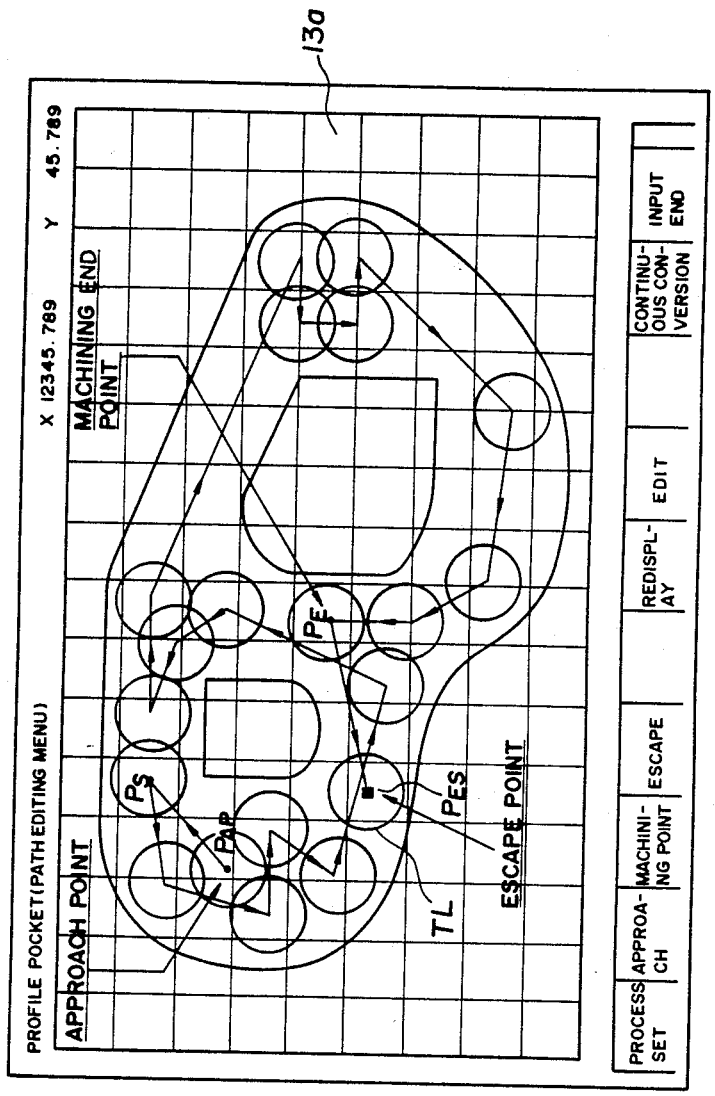
Figure 13A:
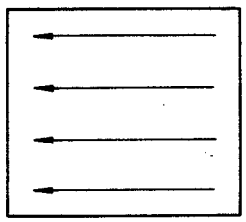
FIGS. 13(a), 13(b), 13(c), 14 and 15 are views for explaining pocket machining according to the prior art.
Figure 13B:
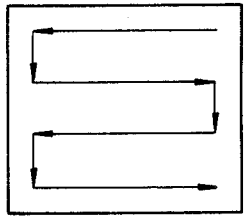
Figure 13C:
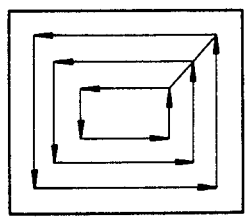
Figure 14:
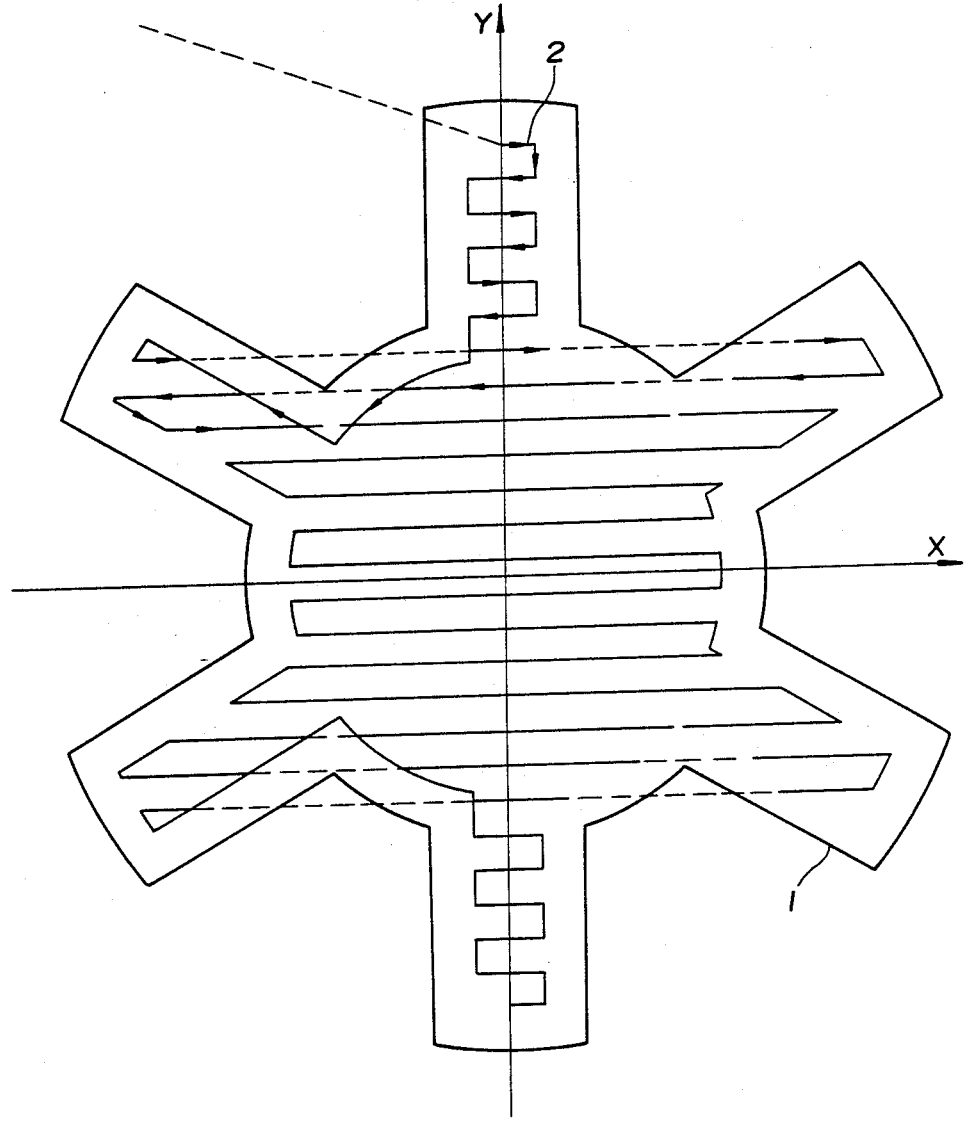
Figure 15:
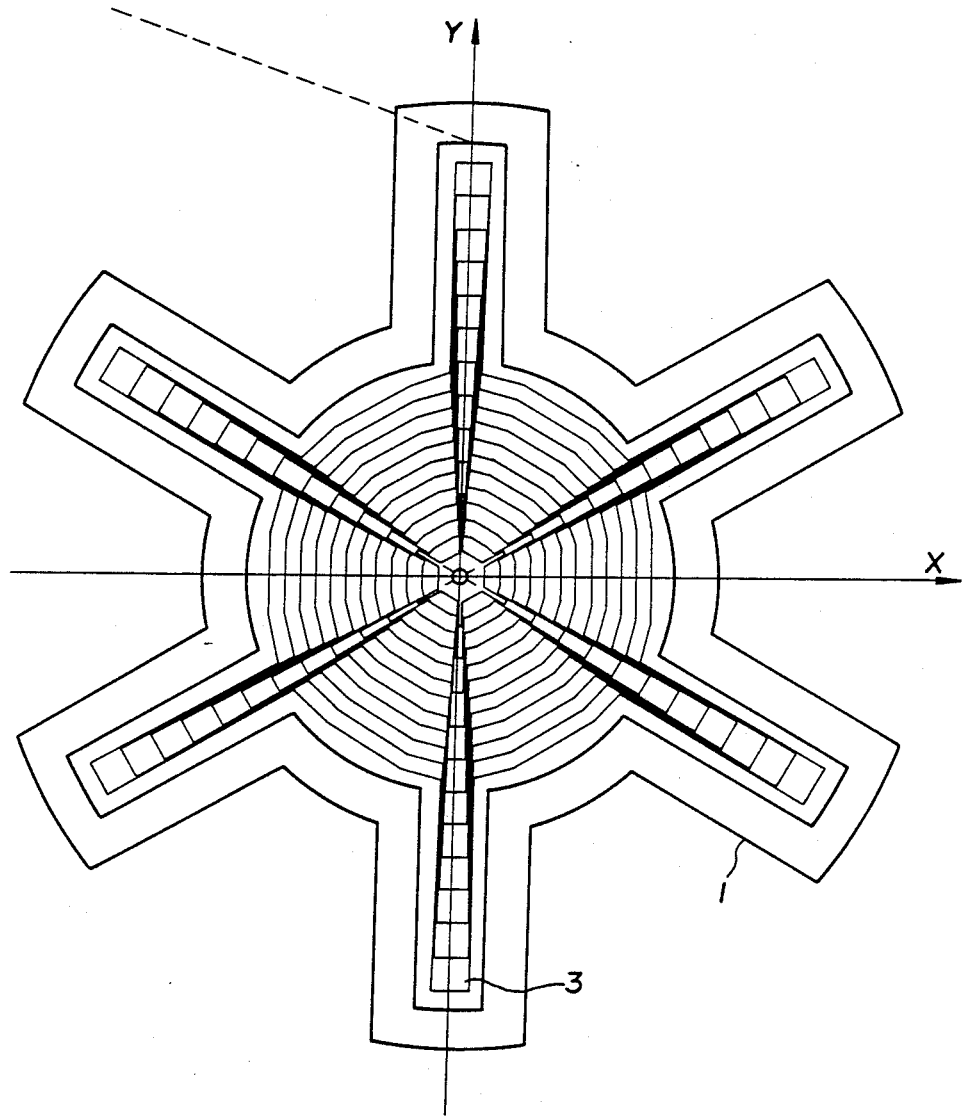
Figure 16:
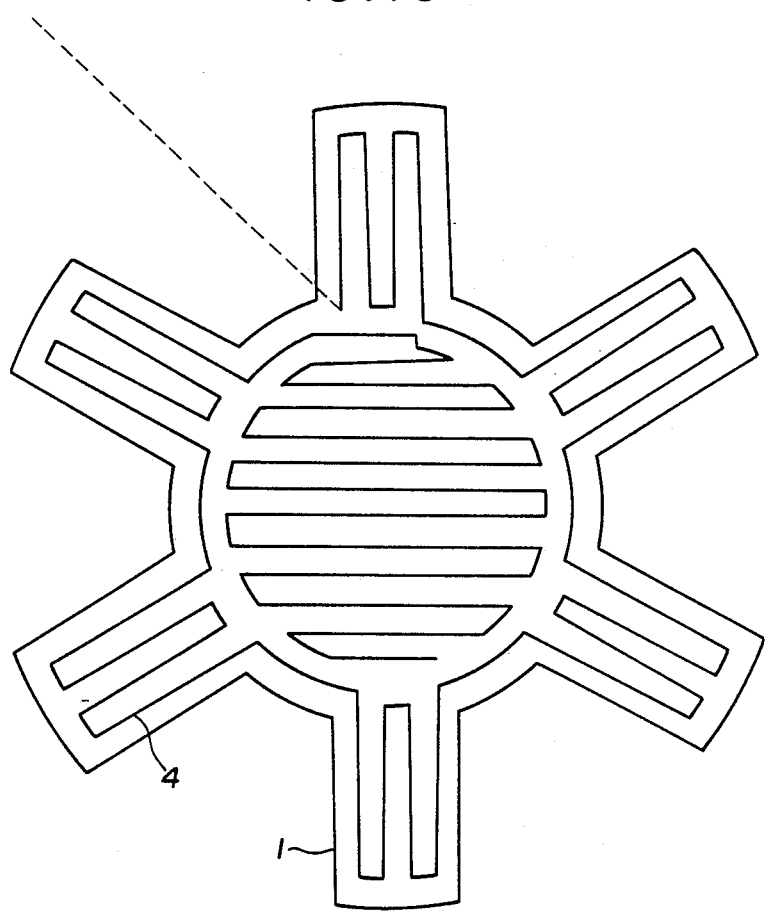
FIG. 16 is a view for explaining pocket machining along an optimum tool path.

(12) As a result, the automatic programming section 11 causes the path editing display page shown in FIG. 12 to be displayed on the display unit, creates an NC program for performing machining by moving a tool along the inputted tool path, stores the NC program in an internal magnetic bubble memory 11a, and ends the processing for creating the NC program for pocket machining.

In order to perform the pocket machining operation, the created program is transferred from the magnetic bubble memory 11a to the internal machining memory 12a of the NC control section 12.

Though it has been described hereinabove that pocket machining is performed by a series of linear cutting operations, an arrangement can be adopted in which pocket machining includes circular arc cutting.

In accordance with the present invention, the arrangement is such that a profile outline and a graphic cursor are displayed on a display screen, and an NC program is created for pocket machining using points, which are obtained by successively positioning and inputting the graphic cursor in such a manner that there are no portions remaining uncut, as cutting starting and end points of linear cutting. As a result, an NC program for pocket machining can be created through a simple method and in a short period of time.

Furthermore, since the arrangement is such that tool shape is displayed, tool path is displayed in successive fashion and meshes are displayed, it is possible to create an NC program for pocket machining in which cutting efficiency is high and there are no portions left uncut.

What is claimed is:

1. A method of creating a numerical control program for pocket machining of a workpiece in which the interior of a profile outline is machined by a series of cuts along at least one of straight lines and circular arcs, comprising the steps of:
   (a) displaying the profile outline and a graphic cursor on a display screen;
   (b) displaying a grid on the display screen, overlaying the profile outline, the grid formed of squares having sides with a length corresponding to a tool diameter;
   (c) inputting points, by successively positioning the graphic cursor and inputting the coordinates of the graphic cursor at a starting point and end point of one of the straight lines and circular arcs,
   (d) displaying a tool shape, having the tool diameter, at the starting and end points,
   (e) displaying a tool path by successively connecting the starting and end points using the one of the straight lines and circular arcs; and
   (f) creating a numerical control program for moving a tool, having the tool diameter, along the tool path to perform pocket machining.

2. A method of creating a numerical control program for pocket machining according to claim 1, wherein the length of the sides of the grid displayed on the display screen in step (b) represents $D \cdot \alpha/100$, where D is the tool diameter and $\alpha$ corresponds to a percentage of the tool diameter used for cutting.

3. A method of creating a numerical control program for pocket machining according to claim 1, wherein step (c) comprises the steps of:
   (c1) selecting one of approach setting, machining path setting and escape setting, in order;
   (c2) displaying one of an approach setting display page, a machining path setting display page and an escape setting display page in dependence upon said selecting in step (c1);
   (c3) inputting an approach point using the approach setting display page, after approach setting is selected in step (c1);
   (c4) inputting a machining path using the machining path setting display page, after machining setting is selected in step (c1); and
   (c5) inputting an escape point using the escape setting display page after escape setting is selected in step (c1).

4. A method of creating a numerical control program according to claim 1, wherein said displaying of the tool shape in step (d) is maintained at all of the points input in step (c) until the numerical control program has been created.

* * * * *